US012609765B2

(12) United States Patent
Rangwala et al.

(10) Patent No.: US 12,609,765 B2
(45) Date of Patent: Apr. 21, 2026

(54) OUT OF BAND DEMAND ASSIGNED MULTIPLE ACCESS

(71) Applicant: Hughes Network Systems, LLC, Germantown, MD (US)

(72) Inventors: Mustafa Rangwala, Germantown, MD (US); Raghunandan Janardhan, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 407 days.

(21) Appl. No.: 18/337,668

(22) Filed: Jun. 20, 2023

(65) Prior Publication Data

US 2024/0430003 A1 Dec. 26, 2024

(51) Int. Cl.
| | |
|---|---|
| *H04W 8/18* | (2009.01) |
| *H04B 7/26* | (2006.01) |
| *H04J 1/02* | (2006.01) |
| *H04W 48/14* | (2009.01) |

(52) U.S. Cl.
CPC .............. *H04B 7/2615* (2013.01); *H04J 1/02* (2013.01); *H04W 48/14* (2013.01)

(58) Field of Classification Search
CPC ............. H04W 72/00; H04W 72/1268; H04W 72/1273; H04W 48/14; H04M 3/42042; H04M 3/42059; H04B 7/2615; H04B 7/18582; H04B 7/18589; H04J 1/02; H04L 27/3483
See application file for complete search history.

(56) References Cited

U.S. PATENT DOCUMENTS

| | | | |
|---|---|---|---|
| 2010/0039983 A1* | 2/2010 | Yee | H04B 7/18539 370/316 |
| 2012/0230300 A1* | 9/2012 | Goerke | H04B 7/18539 370/335 |

FOREIGN PATENT DOCUMENTS

WO 02080013 A1 10/2002

OTHER PUBLICATIONS

International Search Report for PCT/US2024/026256.

* cited by examiner

*Primary Examiner* — Phuoc H Doan
(74) *Attorney, Agent, or Firm* — Capitol City TechLaw; Jasbir Singh

(57) ABSTRACT

A system and method for granting demand access to a data network from an Out of band (OOB) network, the method including: locking to an OOB inroute illuminating an OOB coverage area of the OOB network; transmitting an OOB request including a Demand Assigned Multiple Access (DAMA) request for the data network to an OOB Network Management System (NMS) via the OOB inroute; sending, from the OOB NMS, the DAMA request to a data NMS of the data network; and fulfilling the DAMA request.

20 Claims, 2 Drawing Sheets

OUT OF BAND DEMAND ASSIGNED MULTIPLE ACCESS

FIELD

Modern satellite communication systems can use narrow spot beams or steerable beams to provide high throughput connectivity to a fixed or mobile User Terminal (UT). An Out of Band (OOB) request via an OOB channel may be used for assignment/allocation of a Demand Assigned Multiple Access (DAMA) channel. In some embodiments, forwarding the OOB request via the OOB channel to a data satellite constellation, such as, a Low-Earth Orbit (LEO), a Medium-Earth Orbit (MEO) or a Geosynchronous-Earth Orbit (GEO) constellation, is disclosed. In some embodiments, the OOB channel may be a GEO channel, a cellular channel or a terrestrial channel.

BACKGROUND

The Prior art Demand Assigned Multiple Access (DAMA) systems use an in-network admission request from a User Terminal (UT) to request dedicated bandwidth for data flow. The in-network admission request uses a wide-area beam/coverage to make an admission request to the DAMA systems and assumes that an antenna at the UT can close a connection to the wide-area beam. Modern satellite communication systems can use narrow spot beams or steerable beams to provide high throughput connectivity to a fixed or mobile terminal. The wide beam may not be available (due to absence of an antenna or inability to obtain a beam lock or the like), and the spot beam may be available on demand or steered on demand to the UT location. In some prior art implementations, the phased array design of some satellites may preclude availability of a wide-area beam to act as a regional/global admission access beam. As such, accessing the wide-area beam/coverage to make the admission request to the DAMA systems is infeasible. In such situations, a prior art DAMA admission request does not provide a streamlined method to connect to the satellite network and be assigned a DAMA channel.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In a dynamic spot beam/steerable beam network, typically the network planning function has to be performed apriori and network resources need to be locked for a longer duration than needed for use. In the present teachings, the just-in-time nature of DAMA can be leveraged and no apriori planning is necessary. This system/protocol sequence allows 'any' out-of-band system to allow a higher performing network to be provisioned over a mobile or fixed antenna terminal, for example, a small antenna terminal. In some embodiments, OOB is not limited to satellite networks. OOB may be a S-band, L-band, a Cellular network or the like.

In some aspects, the techniques described herein relate to a method for granting demand access to a data network from an Out of band (OOB) network, the method including: locking to an OOB inroute illuminating an OOB coverage area of the OOB network; transmitting an OOB request including a Demand Assigned Multiple Access (DAMA) request for the data network to an OOB Network Management System (NMS) via the OOB inroute; sending, from the OOB NMS, the DAMA request to a data NMS of the data network; and fulfilling the DAMA request.

In some aspects, the techniques described herein relate to a method further including receiving, via an OOB outroute, an OOB request response including a DAMA request response.

In some aspects, the techniques described herein relate to a method, further including sending an OOB request response from the OOB NMS.

In some aspects, the techniques described herein relate to a method, wherein the locking includes utilizing a non-demand assigned multiple access channel of the OOB network as the OOB inroute.

In some aspects, the techniques described herein relate to a method, wherein the OOB inroute includes an Internet of Things (IoT) channel and the OOB request is formatted as an IoT request.

In some aspects, the techniques described herein relate to a method, wherein the OOB network includes a Geosynchronous Earth Orbit (GEO) constellation and the data network includes a GEO, a Low-Earth Orbit (LEO) or Medium-Earth Orbit (MEO) constellation.

In some aspects, the techniques described herein relate to a method, wherein the OOB network includes a cellular network and the data network includes a GEO, LEO or MEO constellation.

In some aspects, the techniques described herein relate to a method, wherein the OOB network includes a first type of satellite constellation and the data network includes a second type of satellite constellation that is different than the first type.

In some aspects, the techniques described herein relate to a method, further including authenticating the DAMA request prior to the fulfilling.

In some aspects, the techniques described herein relate to a method, wherein the DAMA request includes a geolocation of a User Terminal (UT), properties of the UT, and a target DAMA channel.

In some aspects, the techniques described herein relate to a method, wherein the DAMA request includes a DAMA configuration for the fulfilling and the fulfilling fulfills the DAMA request based on the DAMA configuration.

In some aspects, the techniques described herein relate to a system to grant demand access to a data network from an Out of band (OOB) network, the system including: an OOB modem to lock to an OOB inroute illuminating an OOB coverage area of the OOB network; an DAMA module to transmit an OOB request including a Demand Assigned Multiple Access (DAMA) request for the data network to an OOB Network Management System (NMS) via the OOB inroute; an OOB NMS to send the DAMA request to a data NMS of the data network; and a data NMS to fulfill the DAMA request.

In some aspects, the techniques described herein relate to a system further including receiving, via an OOB outroute, an OOB request response including a DAMA request response.

In some aspects, the techniques described herein relate to a method, wherein the OOB NMS sends an OOB request response.

In some aspects, the techniques described herein relate to a system, wherein the locking includes utilizing a non-demand assigned multiple access channel of the OOB network as the OOB inroute.

In some aspects, the techniques described herein relate to a system, wherein the OOB inroute includes an Internet of Things (IoT) channel and the OOB request is formatted as an IoT request.

In some aspects, the techniques described herein relate to a system, wherein the OOB network includes a Geosynchronous Earth Orbit (GEO) constellation and the data network includes a GEO, a LEO or MEO constellation.

In some aspects, the techniques described herein relate to a system, wherein the OOB network includes a cellular network and the data network includes a GEO, Low-Earth Orbit (LEO) or MEO constellation.

In some aspects, the techniques described herein relate to a system, wherein the DAMA request includes a geolocation of a User Terminal (UT), properties of the UT, and a target DAMA channel.

In some aspects, the techniques described herein relate to a system, wherein the DAMA request includes a DAMA configuration for the fulfilling and the fulfilling fulfills the DAMA request based on the DAMA configuration.

Additional features will be set forth in the description that follows, and in part will be apparent from the description, or may be learned by practice of what is described.

BRIEF DESCRIPTION OF DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

Figure 1:
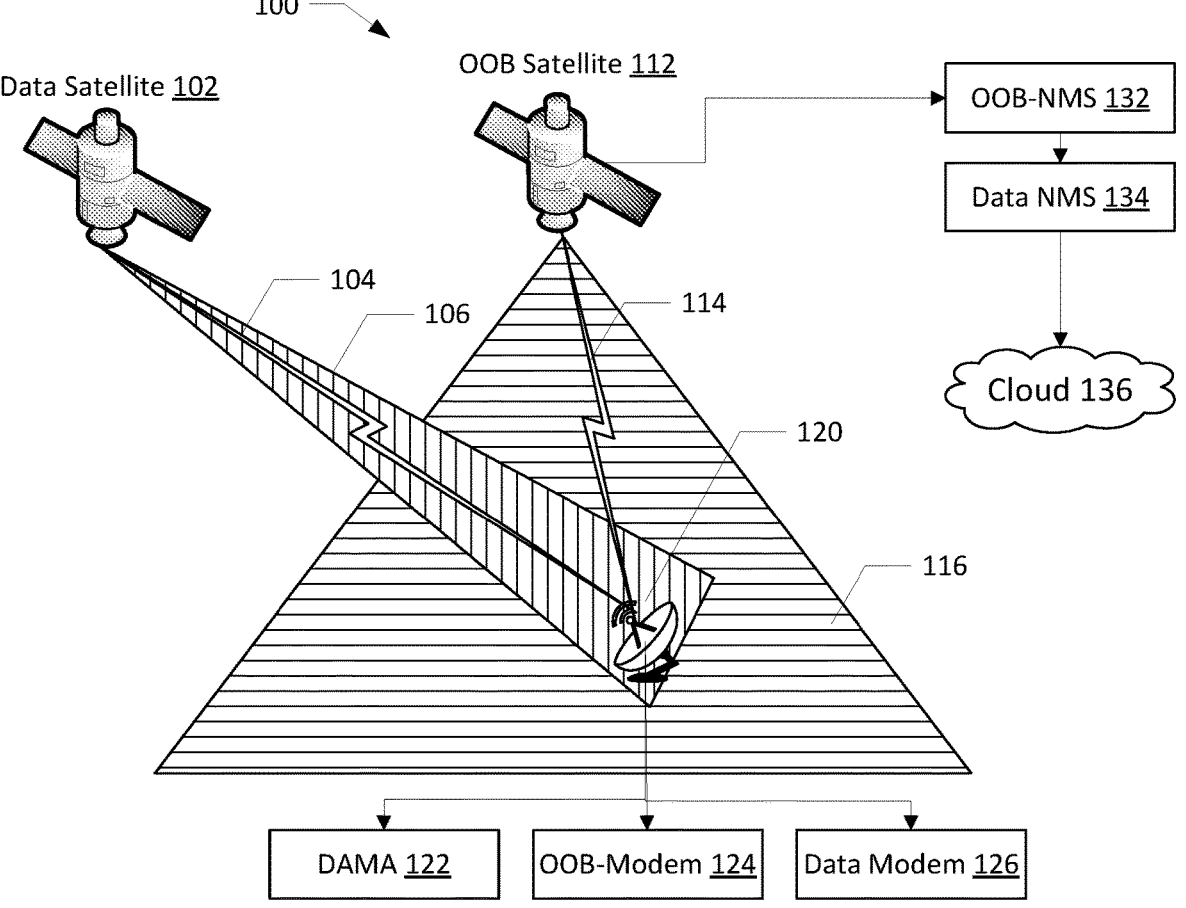
FIG. 1 illustrates a satellite communications system including a OOB satellite and a data satellite for communicating with a UT according to various embodiments.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The present teachings may be a system, a method, and/or a computer program product at any possible technical detail level of integration. The computer program product may include a computer readable storage medium (or media) having computer readable program instructions thereon for causing a processor to carry out aspects of the present teachings.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present teachings may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), micro-controller or programmable logic arrays (PLA) may execute the computer readable program instructions by utilizing state information of the computer readable program instructions to personalize the electronic circuitry, in order to perform aspects of the present teachings.

Aspects of the present teachings are described herein with reference to flowchart illustrations and/or block diagrams of methods, apparatus (systems), and computer program products according to embodiments of the teachings. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present teachings. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present teachings, as well as other variations thereof, means that a feature, structure, characteristic, and so forth described in connection with the embodiment is included in at least one embodiment of the present teachings. Thus, the appearances of the phrase "in one embodiment" or "in an embodiment", as well any other variations, appearing in various places throughout the specification are not necessarily all referring to the same embodiment.

A data satellite communication system may include an Out of Band (OOB) Demand Assigned Multiple Access (DAMA) request in various contexts. A data Network Management System (NMS) may assign a communication channel to a mobile or fixed User Terminal (UT). The data NMS may satisfy DAMA requests for the data satellite network. Without limitation, a UT may send a request out-of-band of the data satellite network or an OOB request. The OOB request may be sent as a default or always used. In some embodiments, the OOB request may be sent when the UT cannot transmit a DAMA request to the data NMS, for example, when the data satellite is not beaming to/from a UT's geolocation, a UT is incapable of transmitting over a data satellite channel, a UT has not registered with the data NMS, connectivity with a data NMS was interrupted, a UT has just arrived into a data satellite's coverage area, the data satellite system to which the OOB request is sent is preferred over a previous data satellite, or the like.

FIG. 1 illustrates a satellite communications system including a OOB satellite and a data satellite for communicating with a UT according to various embodiments.

A Satellite Communications (SATCOM) system 100 may include a data satellite 102, an OOB satellite 112, a User Terminal (UT) 120, an OOB NMS 132 and a data NMS 134. The data satellite 102 may provide a data beam 104 upon demand. In some embodiments, the data beam 104 may be a focused beam having a data coverage area 106. The data beam 104 may be disabled or unscheduled or the like unless the UT 120 is being serviced by the data satellite 102. In some embodiments, the data satellite 102 may be a near orbit satellite. The OOB satellite 112 may provide a OOB beam 114. The OOB beam 114 may cover a OOB coverage area 116. The data coverage area 106 may be smaller than the OOB coverage area 116. The OOB beam 114 may be a GEO satellite beam. The OOB beam 114 may be a broad beam with high availability. The OOB beam 114 may use a robust carrier not generally amenable to atmospheric attenuation. The data beam 104 and OOB beam 114 may be contemporaneously enabled for an overlapping coverage area, for example, after a successful OOB request from the UT 120 to the data NMS 134. In some embodiments, the successful OOB request from the UT 120 to the data NMS 134 may be relayed via the OOB satellite 112 and the OOB NMS 132.

The UT 120 may include a DAMA 122, an OOB modem 124 and a data modem 126. The UT 120 may be disposed in the OOB coverage area 116 of the OOB beam 114. The OOB modem 124 may be used to lock with a OOB beam 114 between the UT 120 and the OOB satellite 112. The OOB beam 114 may include an inroute and an outroute. In some embodiments, the OOB beam 114 may include only an outroute.

The data modem 126 may be used to lock with the data beam 104 between the UT 120 and the data satellite 102. The data beam 104 may include an inroute and an outroute, for example, when the UT 120 receives and transmits network traffic via the data beam 104. In exemplary embodiments, the UT 120 may communicate via the data beam 104 to reach a cloud 136 when the data beam 104 provides an inroute and an outroute. In some embodiments, the data beam 104 may include only an outroute, for example, when the UT 120 is receiving a broadcast or is a data sink. In some embodiments, the data beam 104 may include only an inroute, for example, when the UT 120 is a data source.

In some embodiments, even after the establishment or locking of the data beam 104, the UT 120 may use the OOB beam 114 as an outroute.

Whenever the UT 120 wants to communicate with the cloud 136, but communication via with the data satellite 102 is unavailable, the UT 120 may use the DAMA 122 to request a DAMA channel preferably by the data beam 104 when available, and via the OOB beam 114 when the data beam 104 is unavailable or not locked onto. When the data beam 104 is unavailable, the DAMA 122 may compose and send a OOB request to the OOB NMS 132 via the OOB beam 114. The OOB request may request a spot beam/ channel assignment/steerable beam/channel assignment from the data NMS 134 for the UT 120.

The OOB NMS 132 may identify the UT 120 and direct the DAMA request to a target data NMS, namely data NMS 134, where appropriate. In some embodiments, the OOB NMS 132 may authenticate the UT 120 or a user of the UT 120 prior to directing the OOB request to the data NMS 134. In some embodiments, the data NMS 134 may authenticate the OOB request forwarded via the OOB NMS 132 to it.

The data NMS 134 may try to fulfill the OOB request. The data NMS 134 may optionally send a OOB request response including a success or failure indication and assignment configuration to the OOB NMS 132. In some embodiments, the OOB NMS 132 may communicate the OOB request response back to the UT 120 via the OOB satellite 112, for example, when there is an inroute via the OOB beam 114 to the UT 120. The OOB request response may provide the information to lock onto the data beam 104. In some embodiments, a configuration of the data satellite system and/or configuration within the OOB request or the OOB request response may provide the information to lock onto the data beam 104, for example, when the OOB beam 114 does not provide an inroute. As such, the OOB request or request response may provide the specific data network channel information to connect with the data network.

In some embodiments, the UT 120 requests a particular level of service and the DAMA fulfiller (such as OOB NMS 132 or the Data NMS 134) fulfills the request based on network conditions, priority and DAMA configuration/capability of the UT 120. Based on the various network conditions, priority and DAMA configuration/capability, the fulfiller may allocate an alternate level of service The OOB DAMA request may be made using a channel of a non-demand multi-access scheme. Exemplary non-demand multi-access schemes include Asynchronous Scrambled Coded Multiple Access (ASCMA), Scrambled Coded Multiple Access (SCMA), Code Division Multiple Access (CDMA), Time Division Multiple Access (TDMA) and the like.

After sending the OOB request, the DAMA 122 may configure the data modem 126 to switch the UT 120 to the data beam 104. The DAMA 122 may use information included in the OOB request response to configure the data modem 126. The information may include a channel and timing information for the data modem 126. In some embodiments, the DAMA 122 closes the connection to the OOB satellite 112 via the OOB modem 124.

The OOB request may be sent in a standard protocol or a satellite proprietary protocol. The OOB request may be sent using an Internet of Things (IoT) request using one or more the IoT transport technologies (such as, NB-IoT, LoRA, or the like) that may or may not be combined with a standard transport technology (LTE, NR, etc) to communicate the OOB request. Other IoT transports with deep penetration (LPWAN, NTN-IoT, NB-IoT, eMTC, LoRa); broadband wireless services (LTE, NR eMBB); and Low Latency poor coverage (NR URLLC) may be used. In exemplary embodiments, the OOB inroute uses a deep penetrative radio frequency coupled with robust encodings and robust error checking.

In some embodiments, a response to the OOB request may be received via the OOB beam 114. When an IoT infrastructure is employed to process the OOB requests, IoT standard authentication, server disambiguation and traffic control may be used.

A OOB request may be made and completed OOB NMS or Data NMS with or without an acknowledgement of the request being received by the UT. The acknowledgement may include data needed to connect with the data satellite including satellite ephemeris. In some embodiments, the DAMA request may include a geolocation of the UT. In some embodiments, the DAMA request may include com-munication capabilities of the UT. In some embodiments, the DAMA request may request communications based on a shared configuration, for example, DAMA over channel X starting at timestamp Y for a duration Z.

The present teachings disclose a system, methods, and apparatuses to provide a OOB request. The teachings are applicable for a satellite constellation or satellite beams that are moving with respect to the UT or a UT that is moving with respect to the satellite or beam, for example, in a constellation in low Earth orbit, for example at 60-1200 miles altitude, typically called a LEO constellation. This is also applicable for a medium Earth orbit constellation, for example, at 1200-20000 miles altitude, typically called a MEO constellation. Although the term LEO is used for convenience at various points in this description, it must be understood by the reader that the description is equally applicable for MEO and other moving satellite constellation configurations, and for hybrid constellations including LEO, MEO and even geosynchronous orbit satellites. For example, this description is applicable for other moving satellite constellations, including constellations that operate at varying altitudes, i.e., with satellites in elliptical orbit around the Earth, sometimes being closer and sometimes being farther from the Earth.

An inroute transmission is everything transmitted by a UT to a gateway or a network management system (NMS). An outroute transmission is everything received by a VSAT from a gateway or a NMS. For the present teachings, inroute and outroute refer to a terminal transmission path rather than a particular carrier, that path possibly having multiple eli-gible return carrier frequencies, any or none of which might be allocated for use by a given terminal at a given time; inroute and outroute are not constrained to mean a single carrier frequency.

The UT may communicate via uplinks and downlinks. The links may use spot beams provided by a satellite constellation for coverage of a cell, where the UT is cur-rently disposed. Communications signals transmitted to/from the UT can be any combination of standard or proprietary waveforms, for example, a DVB-S or DVB-S2 standard. A NMS may be connected to any combination of communications networks, such as, intra-nets, inter-nets, or the Internet. In some embodiments, the UT may be mobile, for example, a UT disposed in a moving aircraft. Addition-ally, a satellite may create a set of spot beams (not shown) to service UTs within a coverage area.

Applicable VSAT Configurations

In some embodiments a VSAT may include an antenna system including a phased array antenna to simultaneously receive signals from two satellites in different orbital loca-tions. In some embodiments, the VSAT may transmit, optionally simultaneously, to one or more of those satellites. The transmissions and receptions may be concurrent. In some embodiments a single active transmit path at a time is used. In some embodiments, dual active transmit paths may be used simultaneously.

In some embodiments, the VSAT may only have a receive capability on the data network. In some embodiments, the VSAT may only have a transmit capability on the data network. In such embodiments, the OOB may provide access to a data network. The access may include the OOB providing the data network channel information to complete OOB DAMA requests.

The UT may include a phased array antenna system to point at and receive signals from at least two satellites in different orbital positions concurrently. The array antenna system may at the same time transmit to at least one of the two satellites concurrent with the indicated dual reception. The UT may include radio electronics to receive and transmit at the required frequency bands, an encoder coupled to a modulator for transmission, a demodulators coupled to corresponding decoders for reception, and a control processor for protocol and control processing. The control processor may service a Local Area Network (LAN) and any devices connected thereto. The UT may include other components and connectivity necessary for satellite and LAN communication not directly referenced here, but the present teachings apply equally to further UT configurations not illustrated, for example, an integrated outdoor enclosure housing the radio, modulator, encoder, demodulators, decoders, and protocol processing or relay within a single package. In some embodiments, a UT may have to transition between beams of different polarization, for example, between adjacent beams of a given satellite or for beam transitions between satellites. The antenna and radio may support the needed dual pole simultaneous receive operation with associated independent electronic pole selection for each receive path. The UT may include uplink electronic polarization selection and switching, antenna, radio and modem operation in the supported frequency bands of the associated satellites.

Figure 2:
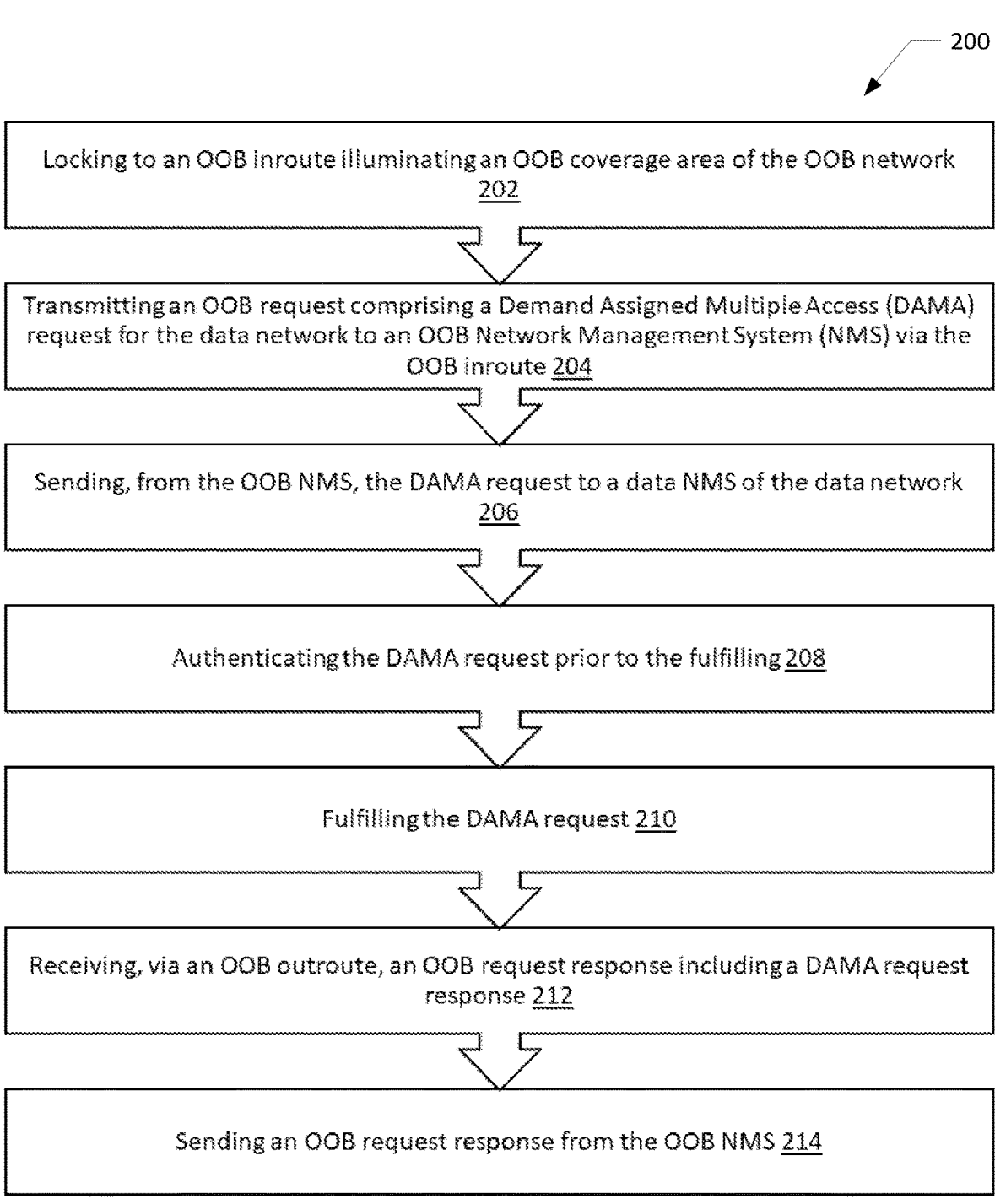
FIG. 2 illustrates a method for granting access to a data network from an OOB network, according to various embodiments.

FIG. 2 illustrates a method for granting access to a data network from an OOB network, according to various embodiments.

A method 200 for granting access to a data network from an OOB network may include operation 202 for locking to an OOB inroute illuminating an OOB coverage area of the OOB network. The method 200 may include operation 204 for transmitting an OOB request comprising a Demand Assigned Multiple Access (DAMA) request for the data network to an OOB Network Management System (NMS) via the OOB inroute. The method 200 may include operation 206 for sending, from the OOB NMS, the DAMA request to a data NMS of the data network. The method 200 may include operation 208 for authenticating the DAMA request prior to fulfilling a request. The method 200 may include operation 210 for fulfilling the DAMA request. The method 200 may include operation 212 for receiving, via an OOB outroute, an OOB request response including a DAMA request response. The method 200 may include operation 214 for sending an OOB request response from the OOB NMS.

Having described preferred embodiments of a system and method (which are intended to be illustrative and not limiting), it is noted that modifications and variations can be made by persons skilled in the art considering the above teachings. It is therefore to be understood that changes may be made in the embodiments disclosed which are within the scope of the invention as outlined by the appended claims. Having thus described aspects of the invention, with the details and particularity required by the patent laws, what is claimed and desired protected by Letters Patent is set forth in the appended claims.

We claim as our invention:

1. A method for granting demand access to a data network from an Out of band (OOB) network, the method comprising:

locking to an OOB inroute illuminating an OOB coverage area of the OOB network;

transmitting an OOB request comprising a Demand Assigned Multiple Access (DAMA) request for the data network to an OOB Network Management System (NMS) via the OOB inroute;

sending, from the OOB NMS, the DAMA request to a data NMS of the data network; and fulfilling the DAMA request.

2. The method of claim 1 further comprising receiving, via an OOB outroute, an OOB request response comprising a DAMA request response.

3. The method of claim 2, further comprising sending an OOB request response from the OOB NMS.

4. The method of claim 1, wherein the locking comprises utilizing a non-demand assigned multiple access channel of the OOB network as the OOB inroute.

5. The method of claim 1, wherein the OOB inroute comprises an Internet of Things (IoT) channel and the OOB request is formatted as an IoT request.

6. The method of claim 1, wherein the OOB network comprises a Geosynchronous Earth Orbit (GEO) constellation and the data network comprises a GEO, a Low-Earth Orbit (LEO) or a Medium-Earth Orbit (MEO) constellation.

7. The method of claim 1, wherein the OOB network comprises a cellular network and the data network comprises a GEO, LEO or MEO constellation.

8. The method of claim 1, wherein the OOB network comprises a first type of satellite constellation and the data network comprises a second type of satellite constellation that is different than the first type.

9. The method of claim 1, further comprising authenticating the DAMA request prior to the fulfilling.

10. The method of claim 1, wherein the DAMA request comprises a geolocation of a User Terminal (UT), properties of the UT, and a target DAMA channel.

11. The method of claim 1, wherein the DAMA request comprises a DAMA configuration for the fulfilling and the fulfilling fulfills the DAMA request based on the DAMA configuration.

12. A system to grant demand access to a data network from an Out of band (OOB) network, the system comprising:

an OOB modem to lock to an OOB inroute illuminating an OOB coverage area of the OOB network;

an DAMA module to transmit an OOB request comprising a Demand Assigned Multiple Access (DAMA) request for the data network to an OOB Network Management System (NMS) via the OOB inroute;

an OOB NMS to send the DAMA request to a data NMS of the data network; and a data NMS to fulfill the DAMA request.

13. The system of claim 12 wherein the DAMA module receives, via an OOB outroute, an OOB request response comprising a DAMA request response.

14. The system of claim 13, wherein the OOB NMS sends an OOB request response.

15. The system of claim 12, wherein the DAMA module utilizes a non-demand assigned multiple access channel of the OOB network as the OOB inroute.

16. The system of claim 12, wherein the OOB inroute comprises an Internet of Things (IoT) channel and the OOB request is formatted as an IoT request.

17. The system of claim 12, wherein the OOB network comprises a Geosynchronous Earth Orbit (GEO) constellation and the data network comprises a GEO, Low-Earth Orbit (LEO) or a Medium-Earth Orbit (MEO) constellation.

18. The system of claim 12, wherein the OOB network comprises a cellular network and the data network comprises a GEO, LEO or MEO constellation.

19. The system of claim 12, wherein the OOB request comprises a geolocation of a User Terminal (UT), properties of the UT, and a target DAMA channel.

20. The system of claim 12, wherein the DAMA request comprises a DAMA configuration for the fulfilling and the fulfilling fulfills the OOB request based on the DAMA configuration.

\* \* \* \* \*